United States Patent [19]

Jenkins

[11] Patent Number: 4,516,341
[45] Date of Patent: * May 14, 1985

[54] PICTURE FRAME ASSEMBLY

[75] Inventor: Robert D. Jenkins, Indianapolis, Ind.

[73] Assignees: David G. Reilich; Jeffrey J. Quinn, both of Indianapolis, Ind. ; part interest to each

[ * ] Notice: The portion of the term of this patent subsequent to Sep. 13, 2000 has been disclaimed.

[21] Appl. No.: 489,239

[22] Filed: Apr. 28, 1983

Related U.S. Application Data

[63] Continuation-in-part of Ser. No. 340,257, Jan. 18, 1982, Pat. No. 4,403,434.

[51] Int. Cl.³ .............................................. G09F 1/12
[52] U.S. Cl. ........................................ 40/152; 403/402
[58] Field of Search ............... 40/155, 152, 152.1; 403/401, 402

[56] References Cited

U.S. PATENT DOCUMENTS

| | | | |
|---|---|---|---|
| 2,654,451 | 10/1953 | Schmidgall | 40/152 |
| 3,534,490 | 10/1970 | Herbert | 40/152 |
| 3,965,601 | 6/1976 | Nielsen | 40/155 |
| 4,122,617 | 10/1978 | Nielsen | 40/155 |
| 4,124,323 | 11/1978 | Freeman | 40/155 |
| 4,236,847 | 12/1980 | Yasuda | 40/155 |
| 4,377,915 | 3/1983 | Zossimas et al. | 40/155 |
| 4,403,434 | 9/1983 | Jenkins | 40/152 |

FOREIGN PATENT DOCUMENTS

| | | | |
|---|---|---|---|
| 2501990 | 7/1976 | Fed. Rep. of Germany | 40/152 |
| 425930 | 2/1911 | France | 40/152 |

Primary Examiner—Gene Mancene
Assistant Examiner—James R. Hakomaki
Attorney, Agent, or Firm—Woodard, Weikart, Emhardt & Naughton

[57] ABSTRACT

A picture frame made of metal extrusions of identical cross sectional shape is assembled at its corners by the use of corner plate assemblies and cam operating buttons. The corner plate assemblies include a reaction plate having cam ramps formed therein, and a reaction sub-plate. The two plates are in closely-spaced parallel relationship to each other. There is an offset in one of the plates at the corner where it is welded to the other plate. The cam operating buttons are caged between the plates but can be operated by a quarter turn with a screwdriver which will tighten or loosen the corner assembly in two picture frame members joined at a corner, to thereby secure the frame members together at a corner.

18 Claims, 18 Drawing Figures

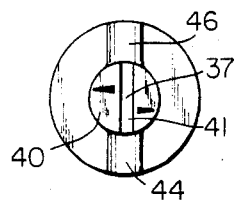
Fig. 7
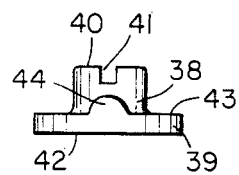
Fig. 6
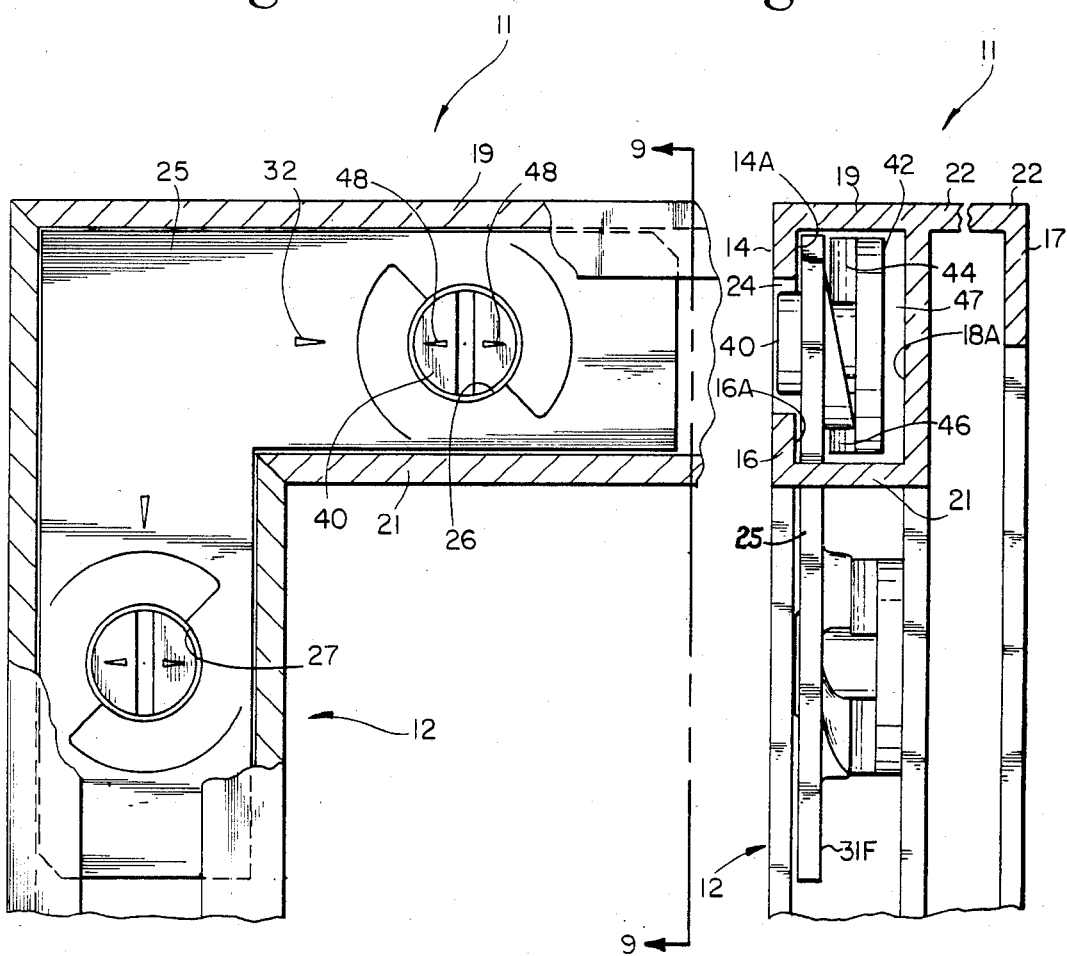
Fig. 8
Fig. 9

PICTURE FRAME ASSEMBLY

CROSS REFERENCE TO RELATED APPLICATION

This application is a continuation-in-part of my original application Ser. No. 340,257, filed Jan. 18, 1982 entitled "Picture Frame Assembly", now U.S. Pat. No. 4,403,434.

BACKGROUND OF THE INVENTION

1. Field of the Invention

This invention relates generally to picture frames, and more particularly to means facilitating assembly of metal picture frames.

2. Description of the Prior Art

The prior art has disclosed various ways of assembling picture frames. Three patents of particular interest in this regard are U.S. Pat. No. 3,534,490 issued Oct. 20, 1970 to D. P. Herbert, U.S. Pat. No. 3,965,601 issued June 29, 1976, and U.S. Pat. No. 4,122,617 issued Oct. 31, 1978, both to Helmar Nielson. In the former of these patents, the frame members are metal extrusions and are held together at the corners by angled members having set screws threaded therein and bearing on portions of the frame members to lock the angle members in the frame members at the corners. In the Nielson patents, the frame members are also made of metal extrusions of a cross section similar to but slightly different from those in Herbert. In the Nielson construction, several different types of corner pieces are employed with set screws to hold the corners together.

Although the Herbert patent discloses one way of holding extrusions together at corners to form a picture frame, and the Nielson patents show another way to do the same thing and, at the same time, force the corners together at the front of the frame, both have some disadvantages. One primary disadvantage can be best recognized when one considers the fact that there is a significant market for non-professionals, who wish to do their own work in framing pictures. Occasionally such individuals do not get the corners together quite adequately. The Nielson patents represent an effort to improve the ability of an individual to make a good corner. But in one embodiment of Nielson, where the L-shaped bearing plate 28 is used, this involves an extra piece at each of the corners, thus increasing the expense, weight, and number of pieces the user must deal with at each corner. In the other embodiments, where only one piece is used, and in the Herbert construction, the set screw bears on the aluminum frame itself. If the corner is not properly assembled the first time, and the set screw is tightened in place, it will make it difficult to ever correctly assemble the corner thereafter. The reason for this is the fact that, once tightened, the set screw normally leaves a dent in the metal. At each subsequent reassembly of the corner, the set screw tends to re-seat itself in the dent made the first time.

SUMMARY OF THE INVENTION

Described briefly, according to a preferred embodiment of the present invention, a frame assembly is provided of a plurality of framing members having a generally C-shaped cross section. Connector assemblies are located at the end-to-end junctions of these members. Each connector assembly has a first bearing piece with two apertures therein. One aperture faces a wall of the C in one of the members at the joint, and the other aperture faces a wall of the C in the other member at the joint. Each connector assembly has a second bearing piece similar to the first and attached to the first at a point between the ends. The second bearing piece is shaped so that, except at the point of connection of the two bearing pieces, there is a space between the bearing pieces extending out to their ends. A bearing pad device is located at each of the apertures, each pad having a stem received in the aperture, and a flange portion. The flange portion is received in the space between the bearing pieces. The large face of the flange portion provides a bearing pad face to engage with the inside surface of the second bearing piece. The outside surface of the second bearing piece engages a wall of the C. A cam lug is provided on the face of the flange opposite the large face. This cam lug engages a cam ramp formed in the first bearing piece. A tool receiver is provided in the end of the stem for access by a tool which, upon turning of the bearing pad device in the aperture, will cause the cam lugs to ride up the cam ramps and tighten the first and second bearing pieces and bearing pad device in the frame member. In this way, the corners can be assembled and locked.

BRIEF DESCRIPTION OF THE DRAWINGS

FIG. 6 is a side view of a bearing pad used in the assembly.

FIG. 7 is an axial view of the bearing pad.

FIG. 8 is a fragmentary view of a corner portion of the frame assembly partially in section showing the bearing piece and bearing pads in place with one of the pads tightened and the other loose during the assembling of the frame.

FIG. 9 is a section taken at line 9—9 in FIG. 8 and viewed in the direction of the arrows.

DESCRIPTION OF THE PREFERRED EMBODIMENT

Figure 1:
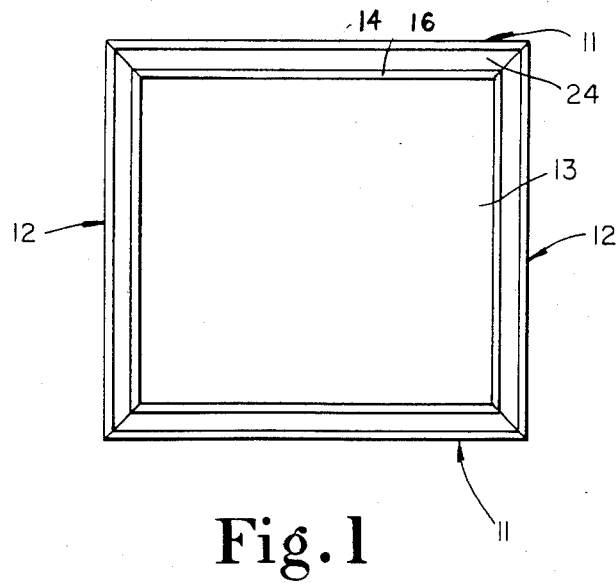
FIG. 1 is a rear view of a picture frame assembly according to one embodiment of the present invention.
Figure 2:
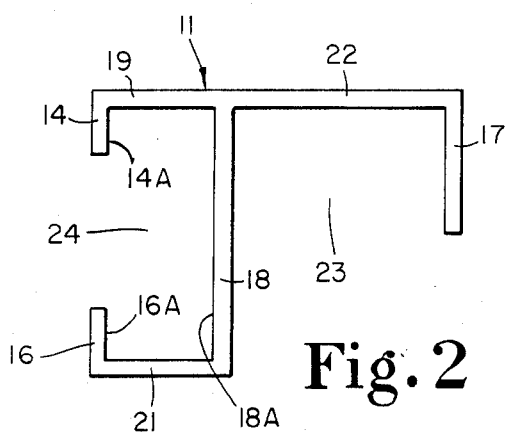
FIG. 2 is an end view of a typical frame member used in the assembly of FIG. 1.

Referring now to the drawings in detail, and particularly to FIG. 1, the picture frame assembly of FIG. 1 includes upper and lower framing members 11 and side framing members 12 mounting a picture therein with the picture backing shown at 13. All four of the framing members shown in this embodiment are of identical cross sectional shape as shown in FIG. 2 and can be made of aluminum extrusions or of other materials by appropriate processing. They are mitered at the ends as shown in FIG. 1 with the angle being appropriate to the number of sides in the frame. In the illustration, a 45° angle is used for a rectangular frame. For a hexagon or other polygonal shape, the angles would be appropriate to the particular shape.

In FIG. 1, where we are looking at the rear of the frame, one can see the rear face of each of the four framing members. As shown in FIG. 2, the rear face of member 11 is provided by spaced co-planar flanges 14 and 16 whose inner surfaces 14A and 16A provide a bearing wall in the framing member, as will be seen. The front face of the frame is provided by a front flange 17 in a plane parallel to that of the plane of the inside walls of flanges 14 and 16.

The flanges 14 and 16 are parallel to a wall portion 18 whose face 18A is parallel to and faces the walls 14A and 16A of the flanges 14 and 16. These, together with the portions 19 and 21 of the member 11, provide a C-shaped portion of the frame member. This portion cooperates with the flange 17 and portion 22 to form a channel 23 to receive the picture, backing 13 (FIG. 1) and any external covering such as glass or plastic also in channel 23 to provide protection for the front of the picture (not shown). The C-shaped portion provides a track with a rearwardly opening slot 24 therein for purposes which will soon be described. Because the cross sectional shape of all of the framing members is the same, the slot 24 extends the whole length of each of the frame members. For purposes of the present invention, it is not necessary that the track and slot be uninterrupted throughout the entire length of the members. It is shown this way, with the showing of corner connector assemblies omitted from FIG. 1, to illustrate that it is most convenient for all framing members to be of the same material with identical cross section.

Figure 3:
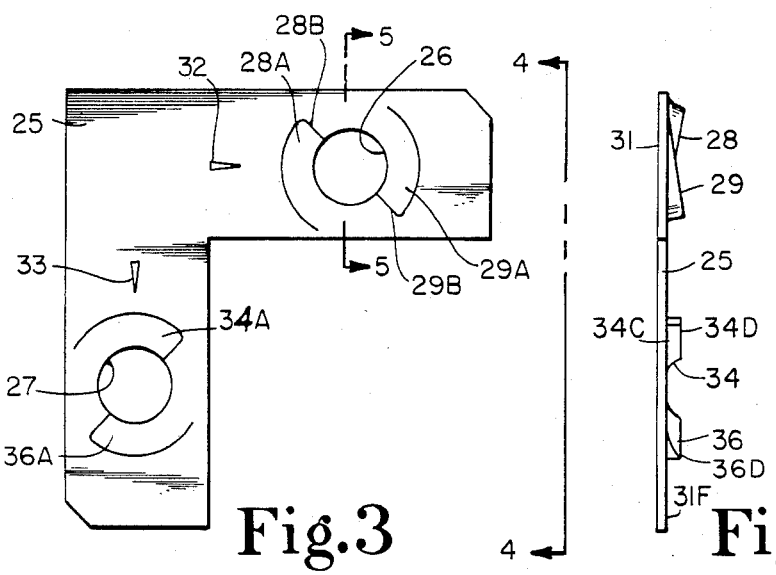
FIG. 3 is a bearing face view of a corner bearing plate used in the assembly.
Figures 4, 5:
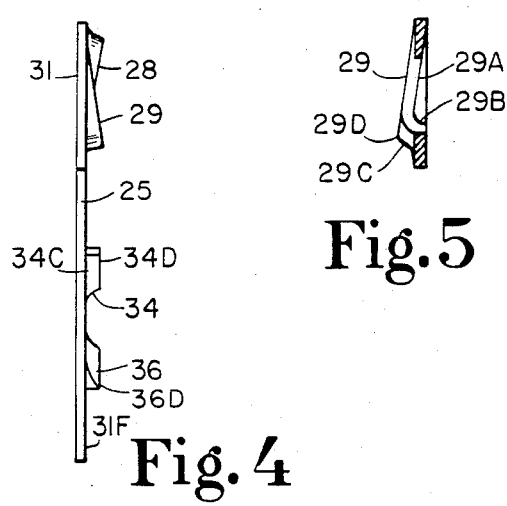
FIG. 4 is an edge view thereof taken at line 4—4 in FIG. 3 and viewed in the direction of the arrows.
FIG. 5 is a section therethrough taken at line 5—5 in FIG. 3 and viewed in the direction of the arrows.

Referring now to FIGS. 3, 4 and 5, FIG. 3 shows a metal plate 25. A convenient material is cold rolled strip steel of prime quality, one-half hard. As an example, for a frame having a nominally one-half inch wide track, the plate of FIGS. 3-5 can be stamped from a steel strip 2 inches wide and 0.050 inches thick. It has a pair of apertures 26 and 27 punched therein at the longitudinal and lateral centers of the two legs of the L-shape of the plate. The L-shaped plate is for use in frames which are rectangular. For frames of other polygonal shapes, the plate would be of an angular shape other than right angle.

At each aperture, two semicircular cam ramps such as 28 and 29 at aperture 26 are cold formed in plate 25. A depression 28A is formed in the face 31 of the plate to form the cam ramp 28 in the opposite face. Similarly, a depression 29A is formed in face 31 to provide the cam ramp 29. Sice this plate bears against the frame member inside walls 14A and 16A (FIG. 2) in the assembly, as a reaction against a cam force applied as will be described, this plate will be hereafter referred to in this description as a "bearing reaction plate". A depression 32 is provided in the surface 31 in a specific orientation with reference to the commencement and conclusion of the cam ramps to assist the user in the assembly of the frame according to the present invention. The lines 28B and 29B at the ends of the depressions 28A an 29A, respectively, have counterpart abutments on the opposite face of the bearing plate at the "high" ends of the cams. The orientation of these is preferably 45° from the longitudinal axis of the leg of the plate in which the associated aperture is located. This relationship will be observed upon reference also to the cam ramp depressions in the face 31 adjacent the aperture 27. The index arrow 33 associated with the aperture 27 and its associated cams has the same relationship to that aperture and its associated cams as the arrow 32 has with reference to the aperture 26 and its associated cams.

Reference to FIG. 5 shows, for example, where the depression 29A ends at the end abutment 29B with the counterpart end abutment 29C at the "high" end 29D of the ramp 29. This is typical of each of the cams in this embodiment. The cams associated with aperture 27 and arrow 33 are 34 and 36 with the end of cam 34 being shown at 34C. The high point of cam 34 is at 34D and the high point of cam 36 is at 36D.

FIGS. 6 and 7 show a pressure pad according to the typical embodiment of the present invention. This pad is typically circular about an axis 37, and includes a stem 38 and flange 39. The stem has a tool receiver therein which is shown at 41 as a screwdriver slot. The flange 39 has a bearing face 42 which is smooth and flat across its entire face. The rear face 43 of the flange has a pair of integral radially extending lugs 44 and 46 thereon which are semi-circular in shape as shown in FIG. 6.

FIGS. 8 and 9 show two views of a corner assembly, which is typical of each of the four corners of this frame assembly of FIG. 1 when made according to one embodiment of the invention. The two legs of the corner bearing plate 25 are disposed respectively in the channels formed by the C-shaped portions of the framing members 11 and 12. A bering pad device is provided at each of the two apertures 26 and 27. The stem of each such device is received in the respective aperture. In order to be able to insert the corner connector assembly in the respective C-shaped channel of the corresponding frame member, it is necessary that the bearing pad cam operating lugs 44 and 46 be away from the high points on the cams, and preferably at the commencement of the cam ramps on the free face 31F of the bearing plate 25. In this way, the bearing pad face 42 has ample clearance space 47 from the wall 18A of the framing member. The stem end 40, with the screwdriver slot 41 therein is exposed in the slot 24. To tighten the connector plate and bearing pad in the C-shaped channel or track, it is necessary only to turn the pad approximately one-quarter turn. This will cause the cam lugs 44 and 46 to ride up the cam ramps 29 and 28, respectively, until the pad 42 engages the wall 18A and forces the bearing surface 31 against the flange walls 14A and 16A. The connector assembly has already been tightened in this way in the member 12. Thus, FIGS. 8 and 9 show the connector assembly loose in the member 11 and tight in the member 12, to show the two different conditions.

In order to assist the user in assembly of the unit, to facilitate entry of the plates and bearing pads in the respective frame members, the outer end 40 of the stem of the bearing pad is provided with indicator pointers 48. These are so related to the cam lugs on the bearing pads that, when aligned with the pointers 32 and 33 on the bearing plate legs, the lugs are at the low points on the cams. This indicates a release condition. When the bearing pad pointers are located transverse to the related pointer in the associated aperture, the cam lugs are fairly high on the cam ramps.

The screwdriver slot could have a different orientation with reference to the lug such as 90° from the orientation shown, and the slot could then be used as an index indicator, instead of the pointers 48. However, other types of tool receivers such as an Allen wrench socket or Phillips screwdriver socket might also be used. In that event, a specific index indicator such as a pointer 48 would be desirable.

Figures 10, 11:
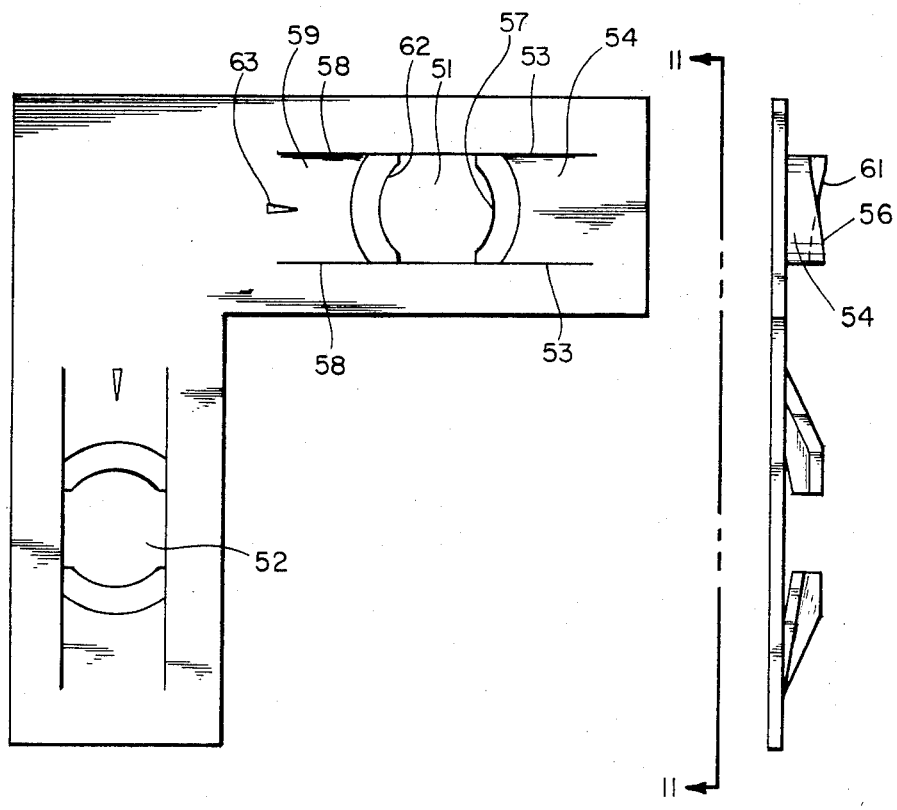
FIG. 10 is a view similar to FIG. 3 but showing an alternate construction.
FIG. 11 is a view thereof taken at line 11—11 in FIG. 10 and viewed in the direction of the arrows.
Figures 12, 13, 14:
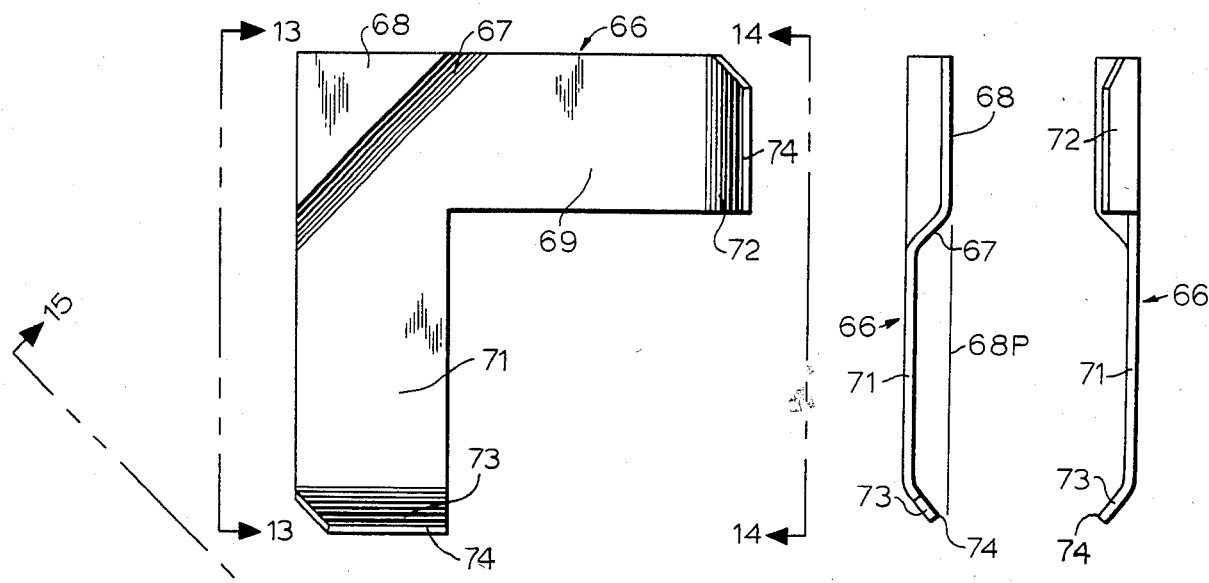
FIG. 12 is an inside face view of another bearing piece employed in a third alternative and preferred embodiment of the present invention.
FIG. 13 is a view thereof taken at line 13—13 in FIG. 12 and viewed in the direction of the arrows.
FIG. 14 is a view thereof taken at line 14—14 in FIG. 12 and viewed in the direction of the arrows.
Figure 15:
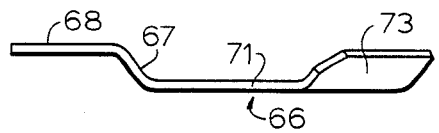
FIG. 15 is a view thereof taken at line 15—15 in FIG. 12 and viewed in the direction of the arrows.

FIGS. 10 and 11 show an alternate embodiment of the corner plate. In this embodiment, instead of the cam ramps being formed as shown in the previous embodiment, forming with lancing is used. Apertures are provided at 51 and 52 in the respective legs. At each of the apertures, the material is lanced as at 53 to provide a cantilever arm 54 with a cam surface 56 at an appropriate ramp angle adjacent the bearing pad stem piloting edge 57. Similarly, the leg is lanced at 58 to provide another cantilever portion 59 with a cam ramp 61 thereon adjacent the bearing pad piloting edge 62. Appropriate orientation indicators such as 63 may be provided. The material used would be preferably high carbon spring steel. This corner bearing plate can be used in the same way as that described above with reference to the preferred embodiment.

Figures 16, 17, 18:
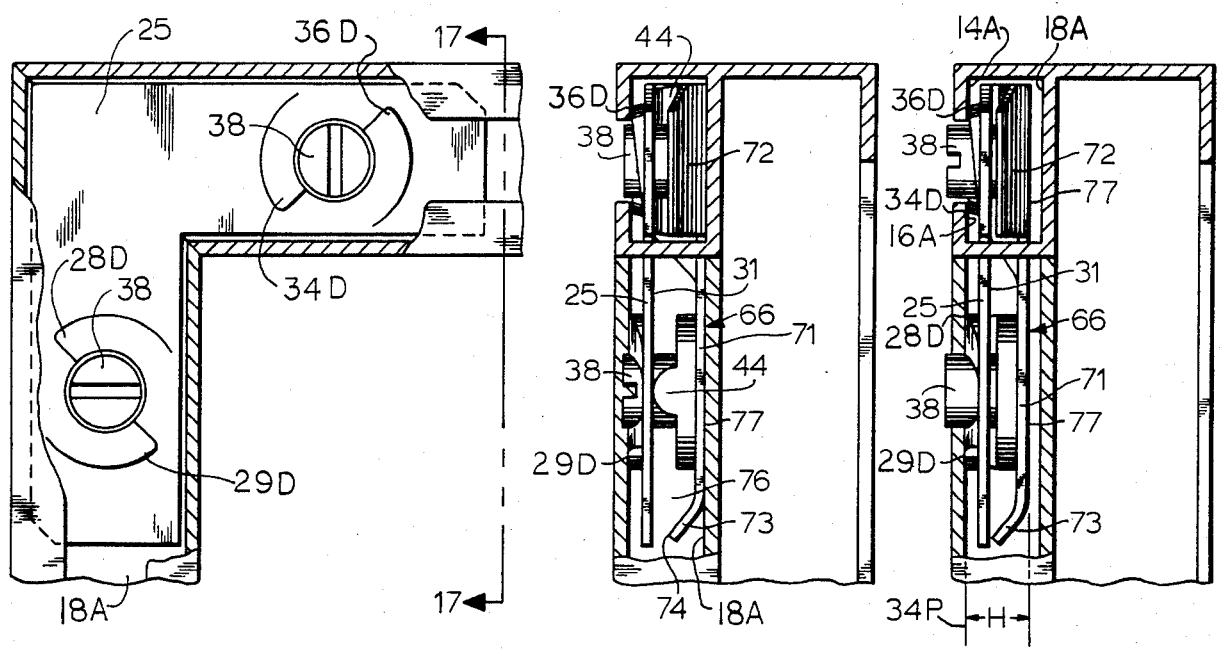
FIG. 16 is a view similar to FIG. 8 but showing the preferred embodiment in assembly, with bearing pieces tight in the frame.
FIG. 17 is a section taken at line 17—17 in FIG. 16 and viewed in the direction of the arrows.
FIG. 18 is a section at the same location, but showing both of the bearing pad units loose but confined in the corner connector assembly.

It was mentioned above that indicator pointers are provided on the bearing pad stem end, in order to assist the user in assembly of the unit. To further assist the user, a third and now-preferred embodiment of the invention is constructed with the same parts shown in FIGS. 1 through 6 and with an additional part as shown in FIGS. 12 through 15 in assembly as shown in FIGS. 16 through 18. All parts shown in FIGS. 1 through 9 are the same, but one is added. This is a bearing reaction sub-plate 66.

The sub-plate 66 is much like the reaction plate in the respect of the material of construction, the thickness, and the width of each of the arms. At the corner, there is an offset 67 providing a shelf 68. This shelf is welded to the face 31 of the reaction plate 25 at the corner. The two arms 69 and 71, extending out from the corner are co-planar and offset from the plane of the shelf 68. When the reaction plate 25 and reaction sub-plate 66 are welded together at the shelf 68, the reaction plate is co-planar with the plane of shelf 68. The tip portions of the arms are bent out of the plane of the arms 69 and 71 and toward the plane of shelf 68, but the edges such as 74 are spaced slightly from the shelf plane 68P.

Before the reaction plate is welded to the sub-plate, two bearing pad units are installed with the stems thereof received in the apertures in the reaction plate. Then they are turned to the "release" position where the cam lugs 44 are received in the depressions in face 31 of the reaction plate 25. Then the shelf 68 can be placed on face 31 and welded to it. It can be otherwise secured such as by brazing, riveting or such other means as may be deemed suitable. In any event, after plates 25 and 66 are secured together, the stems 38 project sufficiently through the apertures in plate 25 that the pad unit cannot fall out of the space 76 between the arms of the reaction plate and sub-plate. In this condition, the distance H (FIG. 18) between the planes of the outer face or surface 77 of the sub-plate, and plane 34P of the tops 28D, 29D, 34D and 36D of the depressions in plate 25 is small enough that, with the aid of the ramps 73, the arms of the connector can be easily slid into place in the channel 24 of the frame. The ramps 73 can thereby serve as guide ramps.

To secure the connector assembly in the corner, the two frame members to be joined at the corner are received on the two arms of the connector assembly. The frame members are then brought into tight abutting engagement of their mitered corners. Then the cam follower lug is turned one-quarter to one-half turn from the position of nesting of the cam follower lugs in the recesses to the position such as shown in FIGS. 16 and 17, where the lugs have risen up the inside cam surfaces onto the flat face 31 of the bearing plate 25. At the same time, they push the sub-plate toward the opposite wall of the frame channel, increasing dimension H except at the welded corner. Before the cam follower lugs reach the face 31, surface 77 of the sub-plate outboard of the bearing pads becomes engaged with wall 18A in the frame. The tops 36D and 34D of the cam depressions have engaged the walls 14A and 16A in the channel groove. When the lugs have reached flat face 31 at the ends of the cam ramps, tops 34D have tightly engaged walls 14A and 16A, and arm surface 77 has tightly engaged the wall 18A, so that the reaction plate and sub-plate arms at that bearing pad unit are tightly locked in the framing member. The same effect occurs in the other framing member when the bearing pad is turned in its pilot aperture to tighten that arm of the connector assembly in the framing member. So it is seen that the framing members are thereby tightly secured on assembly in the corner. If it happens that one of them has moved slightly, the bearing pad can be loosened and the resilience of the sub-plate will cause its associated arm (such as 69 or 71, depending on which pad is loosened) to again space itself from the wall of the channel to permit the framing member to be moved to the extent needed to position it properly for then again tightening the bearing pad unit.

This latter embodiment of the invention facilitates the handling of the corner assembly by the amateur frame assembler, as he or she need not be concerned with dropping the individual bearing pad units during assembly or disassembly of the picture frame. It should be noted that, while the drawings show a rectangular frame, the invention can be used in frames of pentagonal, hexagonal or other shapes, in which case the included angle between the arms of the reaction plate and sub-plate will be greater than ninety degrees, as needed, according to the shape of the frame.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A frame assembly comprising:
   a plurality of framing members arranged in series, with the ends of each member meeting ends of the next adjacent members in the series at junctions, to form a frame, each of said members having a generally C-shaped cross section comprising spaced facing wall means;

a plurality of connector assemblies, one of said connector assemblies being located at each of said junctions of frame members to connect the adjacent frame members together at the junction, each connector assembly including first and second bearing pieces, said first bearing piece having at least two apertures therein spaced from each other and located on opposite sides of the junction between the two frame members being connected by the connector assembly at the junction, said first bearing piece of each connector assembly engaging one of said facing wall means of each of the two frame members on opposite sides of the junction and adjacent said apertures, and said second bearing piece engaging another of said facing wall means of each of the said two frame members, and each connector assembly including at least two bearing pad means, each bearing pad means including a bearing pad portion engaging said second bearing piece of the connector assembly, each bearing pad means including a locating stem received in one of said apertures of the first bearing piece, the stem having a tool receiver therein;

said bearing pieces and bearing pad means having cooperating cam and follower means thereon operable by a tool when received in the tool receiver in the stem of the bearing pad means to tighten and loosen the connector assemblies between the facing wall means at the junctions.

2. The frame assembly of claim 1 wherein:
said first and second bearing pieces are fastened together permanently before assembly in the frame assembly.

3. The frame assembly of claim 2 wherein:
said first and second bearing pieces are generally L-shaped, having an outside corner, and are joined and fixed together at said corner.

4. The frame assembly of claim 3 wherein:
said bearing pieces have spaces between them at the apertures, said bearing pad means having flanges thereon between the stems and the bearing pad portion, said flanges being located in said spaces and confining said bearing pad means in assembly with said bearing pieces regardless of whether said connector assemblies are tight or loose between the facing wall means at the junctions.

5. The frame assembly of claim 4 wherein:
said cam follower means are on said bearing pad means and include lugs on tops of said flanges;
said cam means include depressions in said first bearing pieces and receiving the lugs therein when the connector assembly is loose, said depressions having ramps therein ascended by said lugs when said bearing pad means with said lugs is operated in a tightening direction, to cause said bearing pad portion to bear harder against said second bearing piece to increase the space between the the arms of said first and second bearing pieces to tighten the bearing pieces between the said facing wall means.

6. The frame assembly of claim 5 wherein:
said flanges have said bearing pad portion on one face thereof and said stem projecting from the opposite face thereof.

7. The frame assembly of claim 6 wherein:
said lugs project from said opposite face of said flanges.

8. The frame assembly of claim 7 wherein:
said apertures are circular and sized for fitting reception of the stems in the apertures for piloting the stems in the apertures during operation of the tool in the tool receiver.

9. The frame assembly of claim 8 wherein:
each of the framing members has a front and a rear face, the rear face being provided by a pair of spaced co-planar rear flanges which form the said one wall means of the C-shape, the front face of the framing member being provided by a third flange spaced from said wall means to cooperate with a portion of the C-shape portion to receive a picture in the frame.

10. A connector assembly for securing two framing members together at an angle and comprising:
first and second bearing pieces, each bearing piece having two arms projecting outward from a corner and spaced from the arms of the other bearing piece, said first bearing piece having at least two apertures therein spaced from each other and located on opposite sides of the corner, each connector assembly including at least two cam and follower means, each cam and follower means including cam means on said first bearing piece and follower means having a bearing portion spaced from said first bearing piece and engaging said second bearing piece of the connector assembly.

11. The assembly of claim 10 wherein:
the two arms of each of said bearing pieces are substantially co-planar with each other, and the plane of the arms of the first bearing piece is parallel to and spaced from the plane of the arms of the second bearing piece.

12. The assembly of claim 11 wherein:
said bearing pieces have a fixed relationship to each other at said corner; and
said cam and follower means are operable to selectively increase the space between the arms of said first and second bearing pieces near distal ends of said arms to enable tightening said arms into channels in said framing members.

13. The assembly of claim 12 wherein:
each said follower means include a stem received and piloted in one of said apertures and a lug adjacent said stem;
said bearing portion and lug being confined between said first and second bearing pieces.

14. The assembly of claim 11 wherein:
the two arms of said second bearing piece have guide ramps at distal ends thereof, the ramps being inclined from the plane of the arms of said second bearing piece toward the plane of the arms of said first bearing piece.

15. The assembly of claim 14 wherein:
said second bearing piece is a plate with the corner portion thereof integral with the arms thereof but offset therefrom to a plane tangent the plane of the arms of the first bearing piece.

16. The assembly of claim 14 wherein:
both bearing pieces are plates and are welded together at the portions thereof where the plane of the offset is tangent the plane of the first bearing piece.

17. In a connector assembly, bearing pad means comprising:
a stem having a flange at an end thereof, said flange having a bearing pad portion on one face thereof and having lug means on the opposite face thereof, said stem having a tool receiver at the end thereof.

18. The bearing pad means of claim 17 wherein:
said bearing pad portion and said tool receiver face in opposite directions.

* * * * *